United States Patent
Kamibayashi et al.

(10) Patent No.: US 7,137,012 B1
(45) Date of Patent: Nov. 14, 2006

(54) STORAGE MEDIUM AND CONTENTS PROTECTION METHOD USING THE STORAGE MEDIUM

(75) Inventors: Tooru Kamibayashi, Chigasaki (JP); Hisashi Yamada, Yokohama (JP); Hiroshi Iwasaki, Yokohama (JP); Masafumi Tamura, Chofu (JP); Yasuhiro Ishibashi, Ome (JP); Taku Kato, Kamakura (JP); Makoto Tatebayashi, Takarazuka (JP); Shunji Harada, Osaka (JP); Noboru Katsuta, Itami (JP)

(73) Assignees: Kabushiki Kaisha Toshiba, Kawasaki (JP); Matsushita Electric Industrial Co., Ltd., Osaka (JP)

( * ) Notice: Subject to any disclaimer, the term of this patent is extended or adjusted under 35 U.S.C. 154(b) by 892 days.

(21) Appl. No.: 09/594,011

(22) Filed: Jun. 15, 2000

(30) Foreign Application Priority Data

Jun. 16, 1999 (JP) ................................. 11-169980

(51) Int. Cl.
*G06F 12/14* (2006.01)
(52) U.S. Cl. ................. 713/193; 713/189; 713/192
(58) Field of Classification Search ........ 713/192–193, 713/173, 189; 380/30; 705/51, 158, 57; 235/380; 711/103, 163–164
See application file for complete search history.

(56) References Cited

U.S. PATENT DOCUMENTS

| | | | | |
|---|---|---|---|---|
| 4,960,982 A * | 10/1990 | Takahira | ...................... | 235/382 |
| 5,237,609 A | 8/1993 | Kimura | ........................... | 380/3 |
| 5,432,950 A * | 7/1995 | Sibigtroth | ................... | 711/163 |
| 5,450,366 A * | 9/1995 | Watanabe | .............. | 365/230.01 |
| 5,602,987 A * | 2/1997 | Harari et al. | ................... | 714/8 |
| 5,687,235 A | 11/1997 | Perlman et al. | ................ | 380/25 |
| 5,805,551 A * | 9/1998 | Oshima et al. | ................ | 705/57 |
| 5,912,849 A * | 6/1999 | Yasu et al. | ................... | 365/195 |
| 5,949,877 A * | 9/1999 | Traw et al. | ................. | 713/171 |
| 6,128,740 A * | 10/2000 | Curry et al. | ................. | 713/200 |
| 6,185,686 B1 * | 2/2001 | Glover | ........................ | 713/190 |
| 6,189,098 B1 * | 2/2001 | Kaliski, Jr. | .................. | 713/168 |
| 6,581,160 B1 * | 6/2003 | Harada et al. | .............. | 713/169 |
| 6,679,423 B1 * | 1/2004 | Ijichi et al. | .................. | 235/380 |
| 2001/0002485 A1 * | 5/2001 | Bisbee et al. | ................ | 713/167 |

FOREIGN PATENT DOCUMENTS

| | | |
|---|---|---|
| EP | 0 593 305 A2 | 4/1994 |
| EP | 0 809 244 A2 | 11/1997 |
| EP | 0930556 A2 * | 7/1999 |
| JP | 8-129508 | 5/1996 |

OTHER PUBLICATIONS

"Sandisk and Lexar Settle Patent Dispute" © 2000 Lexar Media Inc. http://www.lexar.com/newsroom/press/press_11_14_00.html.*

(Continued)

*Primary Examiner*—Hosuk Song
*Assistant Examiner*—Thomas Gyorfi
(74) *Attorney, Agent, or Firm*—Finnegan, Henderson, Farabow, Garrett & Dunner, L.L.P.

(57) ABSTRACT

A revocation list is registered a public ROM area. The revocation list designates at least one electronic device in which use of the storage medium by the designated electronic device is to be revoked. A controller receives from the electronic device which attempts to access, identification information indicative of the electronic device, and checks whether identification information corresponding to the received identification information is contained in the revocation list, thereby determining whether or not use of the storage medium by the electronic device which attempts to access should be revoked.

12 Claims, 5 Drawing Sheets

OTHER PUBLICATIONS

Office Action dated Apr. 4, 2003, from the Patent Office of the State Intellectual Property Office of the People's Republic of China (with translation).

Paper No. XP-002134182, Digital Transmission Content Protection White Paper, Specification, Rev. 1.0, (Jul. 14, 1998).

European Search Report mailed Jul. 28, 2005.

* cited by examiner

STORAGE MEDIUM AND CONTENTS PROTECTION METHOD USING THE STORAGE MEDIUM

CROSS-REFERENCE TO RELATED APPLICATIONS

This application is based upon and claims the benefit of priority from the prior Japanese Patent Application No. 11-169980, filed Jun. 16, 1999, the entire contents of which are incorporated herein by reference.

BACKGROUND OF THE INVENTION

The present invention relates to a storage medium for use in recording and reproducing contents such as image data and music data, and more particularly to a storage medium suitable for preventing recording/reproducing of contents by improper electronic devices and a contents protection method using the storage medium.

In these years, with development of computer technology, various electronic devices, such as a personal computer, a settop box, a player and a game machine, which permit multimedia processing, have been developed. This kind of electronic devices can reproduce various digital contents such as image data and music data stored in a storage medium and can download digital contents and use them via the Internet, etc.

These digital contents can be copied or downloaded, without degradation in quality, by adopting digital coding techniques, e.g., MPEG2, MP3, etc. From the standpoint of protection of copyrights, there is a demand for techniques of preventing unlawful use of such digital contents.

However, the storage medium used in electronic devices such as a personal computer, a settop box and a player are, in most cases, reversible and can be recorded/reproduced in another devices. Further, the specifications of such a storage medium are basically open. Since the digital contents can be freely moved/copied, it is difficult in practice to protect the contents stored in the medium from unlawful copying/moving.

As regards a storage medium, like a memory card, in which a storage portion and a controller are integrated, contents may be protected by providing an access disable region (secret region), which can be accessed by a secret procedure alone and cannot be accessed by a user, and storing in the secrete region important information necessary for the use of contents, such as copy control information and move control information.

In this case, when contents are copied/moved between an electronic device (e.g., a personal computer, a settop box, a player) and the storage medium, the electronic device and the storage medium may mutually authenticate each other to confirm that they are lawful ones and share a predetermined contents protection function relating to the copyright protection (contents protection). If they are properly authenticated, key exchange may be performed in accordance with a shared key generation algorithm and a common authentication key may be acquired individually, and the authentication key may be used to encrypt/decrypt a contents key (i.e., a key for decrypting contents) or encrypt/decrypt the contents.

In the above case, there is a problem. Since the information necessary for the mutual authentication is preset at the stage of shipment of the electronic device, a program running on the electronic device may be modified (or attacked) after it is purchased. As a result, an improper device may be determined to be proper in the mutual authentication. Considering this, the mutual authentication is not enough to surely protect the contents.

BRIEF SUMMARY OF THE INVENTION

It is an object of the present invention to provide a storage medium and a contents protection method using the storage medium, which is capable of revoking use of the storage medium by an improper electronic device, thereby preventing unlawful use of contents.

According to one aspect of the present invention, there is provided a storage medium comprising: a specified storage area on which revocation information is registered, the revocation information designating at least one electronic device in which use of the storage medium by the designated electronic device is to be revoked, wherein an electronic device which attempts to access the storage medium is controlled in accordance with the revocation information.

The storage medium may further comprise a controller for receiving from the electronic device which attempts to access, identification information indicative of the electronic device, and checking whether identification information corresponding to the received identification information is contained in the revocation information, thereby determining whether or not use of the storage medium by the electronic device which attempts to access should be revoked.

In the storage medium, when the controller determines that use of the storage medium by the electronic device should be revoked, a subsequent process may be halted.

In the storage medium, when the controller does not determine that use of the storage medium by the electronic device should be revoked, the controller may send the identification information indicative of the storage medium to the electronic device which attempts to access, and contents encrypted with the identification information indicative of the storage medium may be written on a predetermined storage area of the storage medium by the electronic device.

In the storage medium, when the controller does not determine that use of the storage medium by the electronic device should be revoked, the controller may send the identification information indicative of the storage medium to the electronic device which attempts to access, and contents encrypted with the identification information indicative of the storage medium may be read out from a predetermined storage area of the storage medium by the electronic device.

In the storage medium, the specified storage area may be a storage area provided on a read-only non-volatile memory.

In the storage medium, the specified storage area may be a storage area which is provided on a rewritable read-only non-volatile memory and can be accessed only by a secret specific procedure.

According to another aspect of the present invention, there is provided a contents protection method comprising the steps of: providing a specified storage area on storage medium and registering revocation information on the specified storage area, the revocation information designating at least one electronic device in which use of the storage medium by the designated electronic device is to be revoked; and controlling an electronic device which attempts to access the storage medium in accordance with the revocation information.

In the method, the controlling step may comprise the steps of: receiving from the electronic device which attempts to access, identification information indicative of the electronic device; and checking whether identification information corresponding to the received identification information is contained in the revocation information, thereby determining whether or not use of the storage medium by the electronic device which attempts to access should be revoked.

In the method, when it is determined in the checking step that use of the storage medium by the electronic device should be revoked, a subsequent process may be halted.

In the method, the controlling step may comprise the step of sending, when it is not determined in the checking step that use of the storage medium by the electronic device should be revoked, the identification information indicative of the storage medium to the electronic device which attempts to access, wherein contents encrypted with the identification information indicative of the storage medium may be written on a predetermined storage area of the storage medium by the electronic device.

In the method, the controlling step may comprise the step of sending, when it is not determined in the checking step that use of the storage medium by the electronic device should be revoked, the identification information indicative of the storage medium to the electronic device which attempts to access, wherein contents encrypted with the identification information indicative of the storage medium may be read out from a predetermined storage area of the storage medium by the electronic device.

In the method, the specified storage area may be a storage area provided on a read-only non-volatile memory.

In the method, the specified storage area may be a storage area which is provided on a rewritable read-only non-volatile memory and can be accessed only by a secret specific procedure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

An embodiment of the present invention will now be described with reference to the accompanying drawings.

Figure 1:
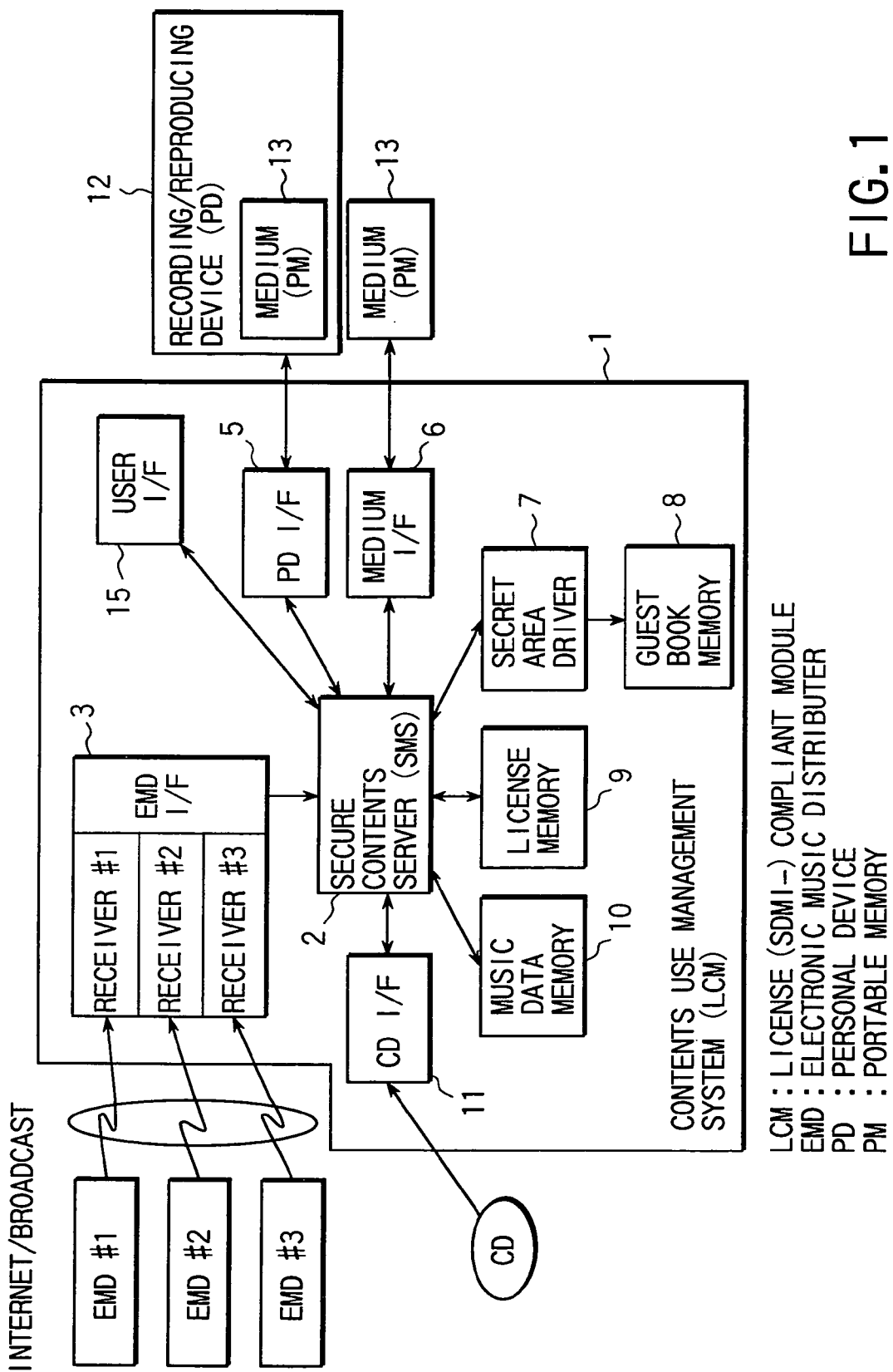
FIG. 1 is a block diagram showing the structure of a contents use management system according to an embodiment of the present invention.

FIG. 1 shows an example of the structure of a contents use management system according to an embodiment of the present invention. In the description below, music data is used as contents (digital contents). Note that, however, the contents may be movie data, game software data, etc.

An EMD (Electronic Music Distributor) is a music distribution server or music distribution broadcast station.

A contents use management system (hereinafter referred to as LCM (License (SDMI-)Compliant Module)) 1 is implemented, for example, by a personal computer (PC). A contents protection method in the LCM 1 is based on a technique in which encrypting/decrypting of contents is managed by using identification information (medium ID) for identifying a storage medium 13 in which contents are to be recorded.

The LCM 1 includes receivers #1 to #3 corresponding to a plurality of EMDs (EMD #1 to EMD #3 in this case). The LCM 1 receives, through the receivers #1 to #3, encrypted contents or their licenses (the use condition and decryption key for the encrypted contents), and the like distributed by the EMDs. Receivers #1 to #3 may have a reproducing function or charging function. Also, the user can purchase the contents he or she likes using the charging function.

The LCM 1 includes a secure contents server (Secure Music Server: SMS in this case; to be also simply referred to as an SMS hereinafter) 2. The SMS 2 receives via an EMD interface (I/F) 3 the encrypted contents purchased by a user. The encrypted contents (music contents in this case) are decrypted by the EMD I/F 3 as needed, and undergo format conversion and re-encryption. Upon receiving the encrypted contents, the SMS 2 stores the received contents in a music data memory 10, and a music data decryption key (contents decryption key) in a license memory 9. The SMS 2 may have a reproducing function for permitting the user to test-listen to the distributed music contents. In this case, the music contents managed by the SMS 2 can be reproduced on the PC.

Figure 2:
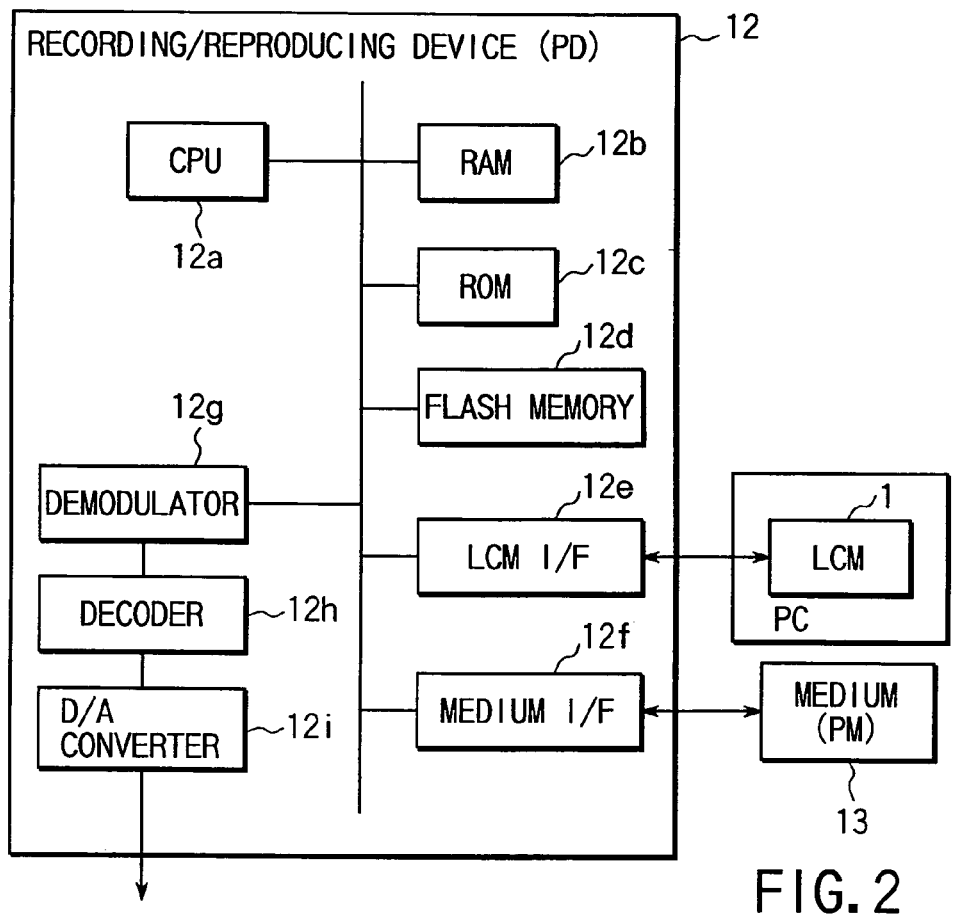
FIG. 2 is a block diagram showing the structure of a recording/reproducing device shown in FIG. 1.

In addition, the SMS 2 has a function of outputting, via a medium I/F 6, contents data (digital contents) to the storage medium (to be also referred to as a PM (Portable Memory) hereinafter) 13, such as a memory card, which can be loaded in the medium I/F 6. The PM 13, when used, is set in a recording/reproducing device (PD (Portable Device) in this embodiment) 12 having a structure as shown in FIG. 2, which is specifically designed for the PM 13. Thus, the contents recorded in the PM 13 can be reproduced on the PD 12.

The SMS 2 records contents on the PM 13 directly via a medium I/F 6 or with the intervention of the PD 12.

Check-in/check-out functions of the LCM 1 will now be described in brief.

The check-out process means making a copy of "parent" contents stored in the LCM 1 on the PM 13 as "child" contents. The "child" contents can be freely reproduced by the PD 12, but it is not allowed to form "grandchild" contents from the "child". The number of "children" "parent" can have is defined as an attribute of "parent". On the other hand, the check-in process means erasing (or disabling to use) "child" contents by the LCM 1 when the PM 13 is loaded in the LCM 1, thereby recovering the right of "parent" contents in the LCM 1 to form one "child". This process is also called check-in at "parent".

Figure 3:
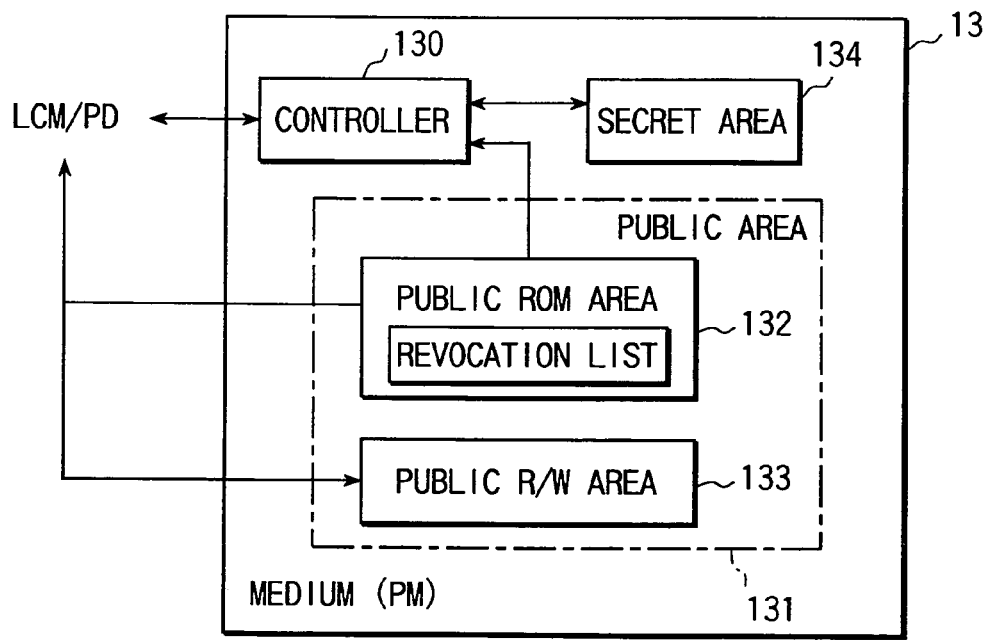
FIG. 3 is a block diagram showing the structure of a storage medium shown in FIG. 1.

The PM 13, as shown in FIG. 3, includes a controller 130 and a storage portion having a public area 131 and a secret area 134. The secret area 134 can be accessed only by a non-public procedure (i.e., a specific secret procedure) via the controller 130. The secret area 134 is used for storing information necessary for decrypting the contents. The secret area 134 includes a secret ROM area for storing constants such as medium identification information (hereinafter "medium key") $K_M$, which is inherent to the associated PM 13, and a secret R/W (read/write) area for storing variables such as a license decryption key, which is secret data (called "medium mark") provided from a licensing side. It suffices if the medium key $K_M$ is inherent to each PM 13, and various identification information such as a serial number or a product number (a product number or a product lot number of each PM 13) may be used. The medium key $K_M$ may be produced from the identification information inherent to each PM 13 and the license decryption key. The secret ROM area is provided on, e.g., a ROM (a read-only non-volatile memory), and the secret R/W area is provided on, e.g., a specific area of a flash memory (rewritable non-volatile memory).

The public area 131 is an area other than the secret area, which can be accessed by an ordinary procedure. The public area 131 includes a read-only public area (hereinafter "public ROM area") 132 and a rewritable public area ("public R/W area") 133. The public ROM area 132 is provided on, e.g., a ROM, and the public R/W area 133 is provided on, e.g., a flash memory. The public ROM area 132 and public R/W area 133 may be provided on the aforementioned ROM, on which the secret ROM area is provided, and on the aforementioned flash memory on which the secret R/W area is provided.

On the public ROM area 132, revocation information relating directly to the present invention is pre-registered at a stage of shipment of the associated PM 13. The revocation information serves to designate an electronic device (LCM, PD) in which use of the PM 13 by the designated electronic device is to be revoked so as to protect the contents, and more specifically, an electronic device (LCM, PD) whose access request for recording/reproducing digital contents in the PM 13 (the public R/W area 133 of PM 13) is to be revoked. In the present embodiment, the revocation information is a list of identification information (device ID) of electronic devices whose access requests are to be revoked. In this description, the revocation information is referred to as "revocation list RL". Specifically, a revocation list RL is pre-registered on the public ROM area 132.

The public R/W area 133 may store encrypted contents key (contents decryption key) and encrypted contents, as needed. The encrypted contents key is obtained by encrypting a contents key $K_C$ (inherent to contents C) for decrypting the contents C with a medium key $K_M$ depending on the PM 13. The encrypted contents (doubly encrypted contents in this embodiment) are obtained by encrypting the contents ($K_C[C]$) encrypted by $K_C$ with the medium key $K_M$ depending on the PM 13 (i.e., $K_M[K_C[C]]$).

Figure 4A:
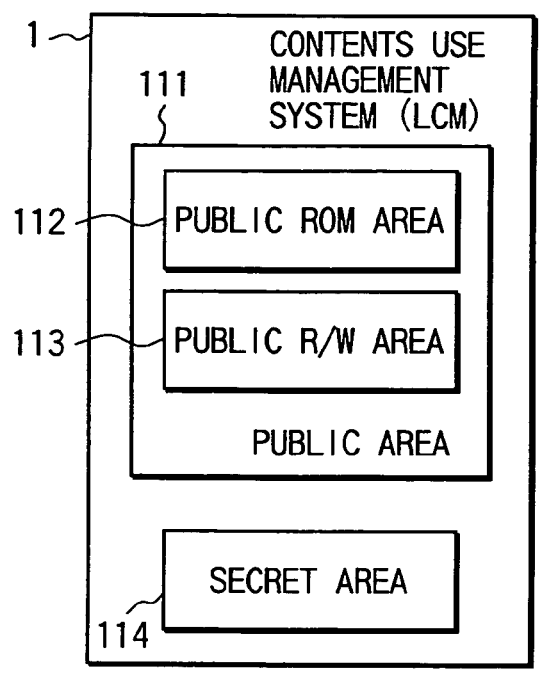
FIGS. 4A and 4B show examples of structures of memory areas in the contents use management system and recording/reproducing device.
Figure 4B:
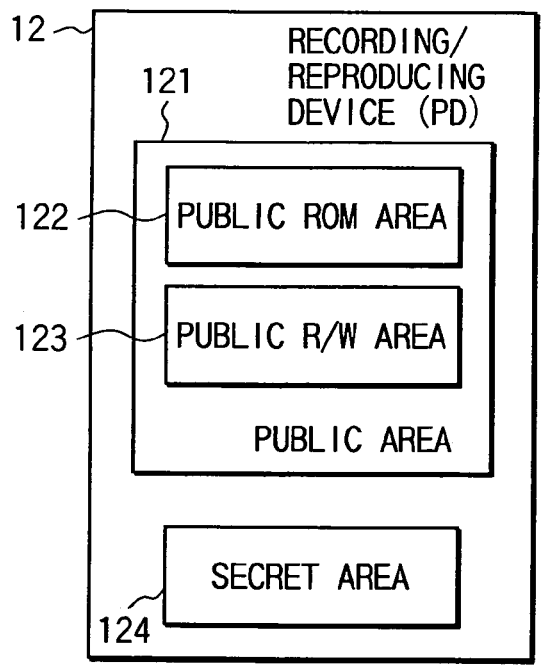

The LCM 1 and PD 12, as shown in FIGS. 4A and 4B, have similar storage areas to the PM 13.

The LCM 1, as shown in FIG. 4A, includes a public area 111 having a public ROM area 112 and a public R/W area 113, and a secret area 114 which can be accessed only by a non-public procedure. The music data memory 10, as shown in FIG. 1, is provided on the public R/W area 113. Identification information (device ID) $ID_{LCM}$ of the LCM 1 is pre-stored on the secret area 114. The contents key $K_C$ of the respective contents are stored on the secret area 114, as needed. A guest book memory 8, as shown in FIG. 1, is provided on the secret area 114. All the music contents stored in the music data memory 10 (public R/W area 113), which is under control of the SMS 2, have as their attribute information the contents ID (TID), or identification information, a predetermined number of copiable contents, i.e. the number of remaining children, and a check-out list. This attribute information is referred to as "guest book" and stored in the guest book memory 8 (in the secret area 114). The LCM 1 has a secret area driver 7 for reading data out of the guest book memory 8 (provided by the secret area 114), after a secret specific procedure for accessing the guest book memory 8 is performed by the SMS 2. Since the guest book does not directly relate to the present invention, the details of the method for using it are not described.

On the other hand, the PD 12, as shown in FIG. 4B, includes a public area 121 having a public ROM area 122 and a public R/W area 123, and a secret area 124 which can be accessed only by a non-public procedure. Identification information $ID_{PD}$ Of the PD 12 is pre-stored on the secret area 124 in a fixed fashion. The contents keys $K_C$ for respective contents are stored on the secret area 124, as needed.

FIG. 2 shows an example of the structure of the PD 12.

When the PM 13 is used, it is loaded in a medium I/F 12f of the PD 12. When the LCM 1 performs a read/write operation on the PM 13 via the PD 12, the secret area 134 (see FIG. 3) of the PM 13 is accessed via a PD I/F 5 in the LCM 1, and an LCM I/F 12e and a medium I/F 12f in the PD 12. The medium I/F 12f has a secret area access section (not shown) for accessing the secret area 134 of PM 13. The public R/W area 123 and secret area 124 (see FIG. 4B) in the PD 12 are provided, for example, on a flash memory 12d. The public ROM area 122 (see FIG. 4B) is provided on a ROM 12c. The ROM 12c stores a program for effecting mutual authentication with the PM 13. The PD 12 executes a process for mutual authentication, etc. with the PM 13 in accordance with this program under control of a CPU 12a.

Figure 5:
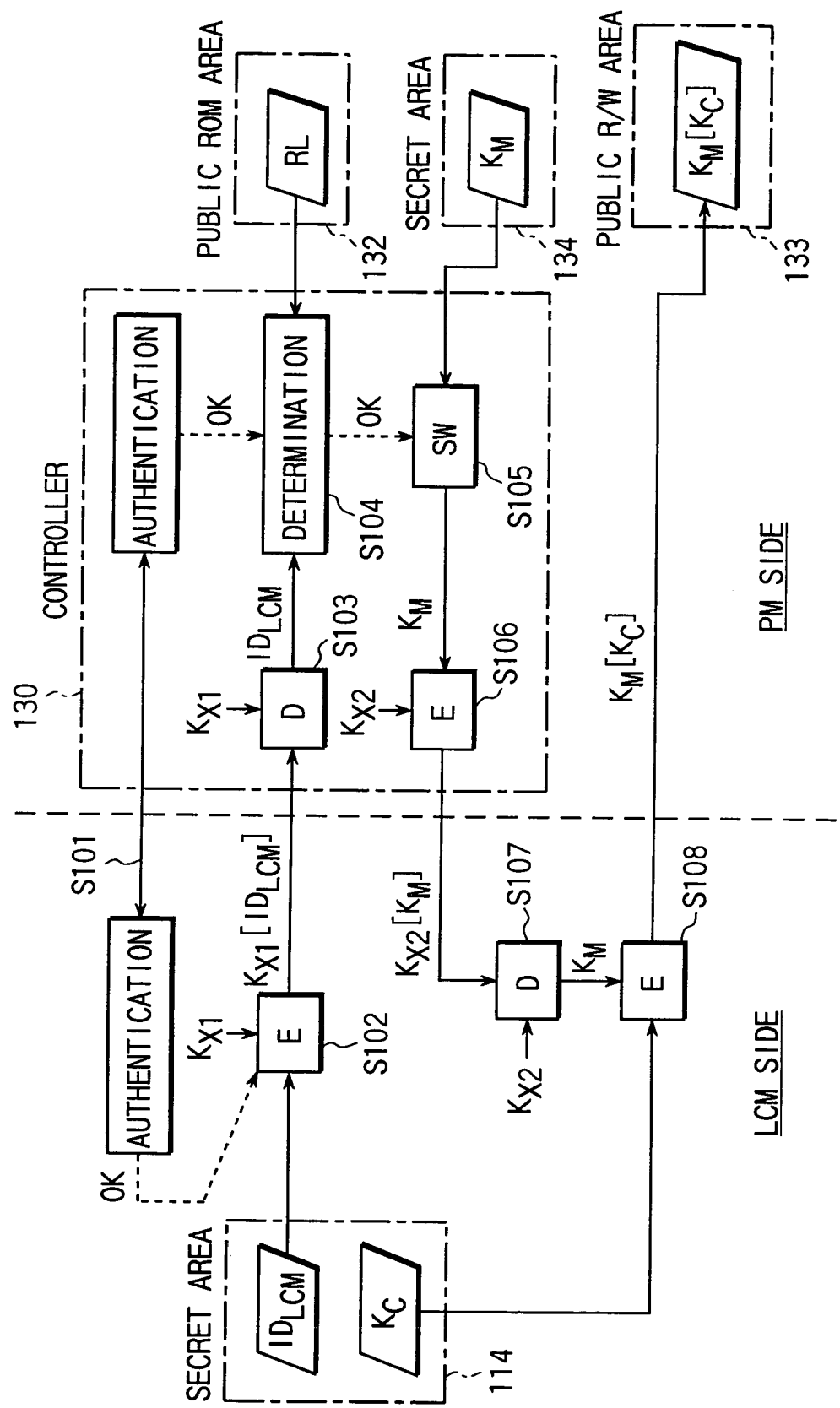
FIG. 5 is a view for explaining operations at a time of recording contents from the contents use management system to the storage medium.

The operation of the present embodiment will now be described with reference to a flow chart of FIG. 5. Assume that a check-out operation is performed, in which encrypted music contents distributed by the EMD are received by the EMD I/F 3 in the LCM 1, the received contents are temporarily stored in the music data memory 10 by the SMS 2, a duplicate of the contents is recorded (copied) as "child" contents on the PM 13 which is loaded, for example, in the medium I/F 6.

To start with, a check-out instruction is issued via, e.g., a user interface (I/F) 15 of the LCM 1, and the PM 13 is loaded in the medium I/F 6 of the LCM 1. At this stage, mutual authentication is effected between the medium I/F 6 of LCM 1 and the controller 130 of PM 13 (step S101). In general, the mutual authentication is performed, as described below, assuming that the LCM 1 is a device A and the PM 13 is a device B.

Consider that the device A authenticates the device B. The device A has a public key kp and the device B has a secret key ks corresponding to the public key kp, if the device B shares a predetermined contents protection function with the device A. The device A generates a random number R and sends it to the device B. The device B receives the random number R and encrypts it with the secret key ks. The device B returns the encrypted random number (expressed by ks[R]) to the device A. The device A decrypts the random number ks[R] using the public key kp. If the decrypted result is equal to the random number R, the device A determines that the device B is a proper counterpart.

Then, the device B performs the same procedure for the device A, thereby to effect mutual authentication. In this case, the device B has a public key, the device A has a secret key, the device A encrypts a random number generated by the device B with the secret key, and the device B decrypts the encrypted random number using the public key and determines whether the decrypted result is equal to the previously generated random number.

If it is confirmed that the LCM 1 and the PM 13 are mutually proper counterparts by the mutual authentication, key exchange is made between the medium I/F 6 of LCM 1 and the controller 130 of PM 13 and the same authentication key ($K_{X1}$) is shared. The key exchange is performed, for example, by a method using a random challenge response represented by CSS (Content Scrambling System) employed as a content encrypting algorithm for DVD-ROMS. The authentication key ($K_{X1}$) is a variable key which varies from operation to operation.

The medium I/F 6 of LCM 1 reads out its own identification information $ID_{LCM}$ kept in secrecy on the secret area 114, and encrypts the read-out information $ID_{LCM}$ using the authentication key ($K_{X1}$). The encrypted information $ID_{LCM}$ (=$K_{X1}[ID_{LCM}]$) is sent from the medium I/F 6 to the PM 13 (step S102).

The controller 130 of the PM 13 decrypts the information $K_{X1}[ID_{LCM}]$ from the LCM 1 with the key ($K_{X1}$) acquired by the previous key exchange, and obtains the information $ID_{LCM}$ (step S103).

Then, the controller 130 of the PM 13 refers to the revocation list RL in the public ROM-area 132, using the decrypted identification information $ID_{LCM}$ of the LCM 1, and determines whether identification information corresponding to the $ID_{LCM}$ is registered. Thereby, it is determined whether use of the PM 13 by the LCM 1 is to be revoked or not (step S104).

If the identification information corresponding to the $ID_{LCM}$ is registered on the revocation list RL, the controller 130 determines that the use of the PM 13 by the LCM 1 should be revoked, and halts the subsequent process.

On the other hand, if the identification information corresponding to the $ID_{LCM}$ is not registered on the revocation list RL, the controller 130 determines that the use of the PM 13 by the LCM 1 is permitted and reads out the medium key $K_M$ kept in secrecy on the secret area 134 (step S105). Then, the controller 130 performs key exchange with the medium I/F 6 of LCM 1 (i.e. via the medium I/F 6 of LCM 1) and shares the same authentication key ($K_{X2}$). In addition, the controller 130 encrypts the read-out medium key $K_M$ using the authentication key ($K_{X2}$) and sends the encrypted $K_M$ (=$K_{X2}[K_M]$) to the LCM 1 (step S106).

The medium I/F 6 of LCM 1 decrypts the $K_{X2}[K_M]$ from the PM 13, using the authentication key ($K_{X2}$) acquired by the key exchange, and obtains the medium key $K_M$ (step S107).

Subsequently, the medium I/F 6 of LCM 1 encrypts the contents key $K_C$ kept in secrecy on the secret area 114, using the obtained medium key $K_M$, and writes the encrypted $K_C$ (=$K_M[K_C]$) in the public R/W area 133 of the PM 13 (step S108).

As has been described above, according to the present embodiment, the LCM 1 receives from the PM 13 the (encrypted) medium key $K_M$, which would not be delivered from the PM 13 to the LCM 1 if the use of the PM 13 is revoked in accordance with the revocation list RL. Using the medium key $K_M$, the LCM 1 encrypts the contents key $K_C$ kept in secrecy on the secret area 114 of LCM 1. The encrypted key is written in the public R/W area 133 of the PM 13. Accordingly, compared to the method in which the authentication key is exchanged between the LCM 1 and PM 13 and the contents key is encrypted/decrypted using the authentication key, the use of the PM 13 by the LCM, which is an object of revocation designated in the revocation list, can be surely revoked (excluded). Besides, when the encrypted contents ($K_C[C]$) stored in the music data memory 10 provided on the public R/W area 113 of LCM 1 is to be sent to the PM 13, the encrypted contents may be further encrypted using the acquired medium key $K_M$.

Figure 6:
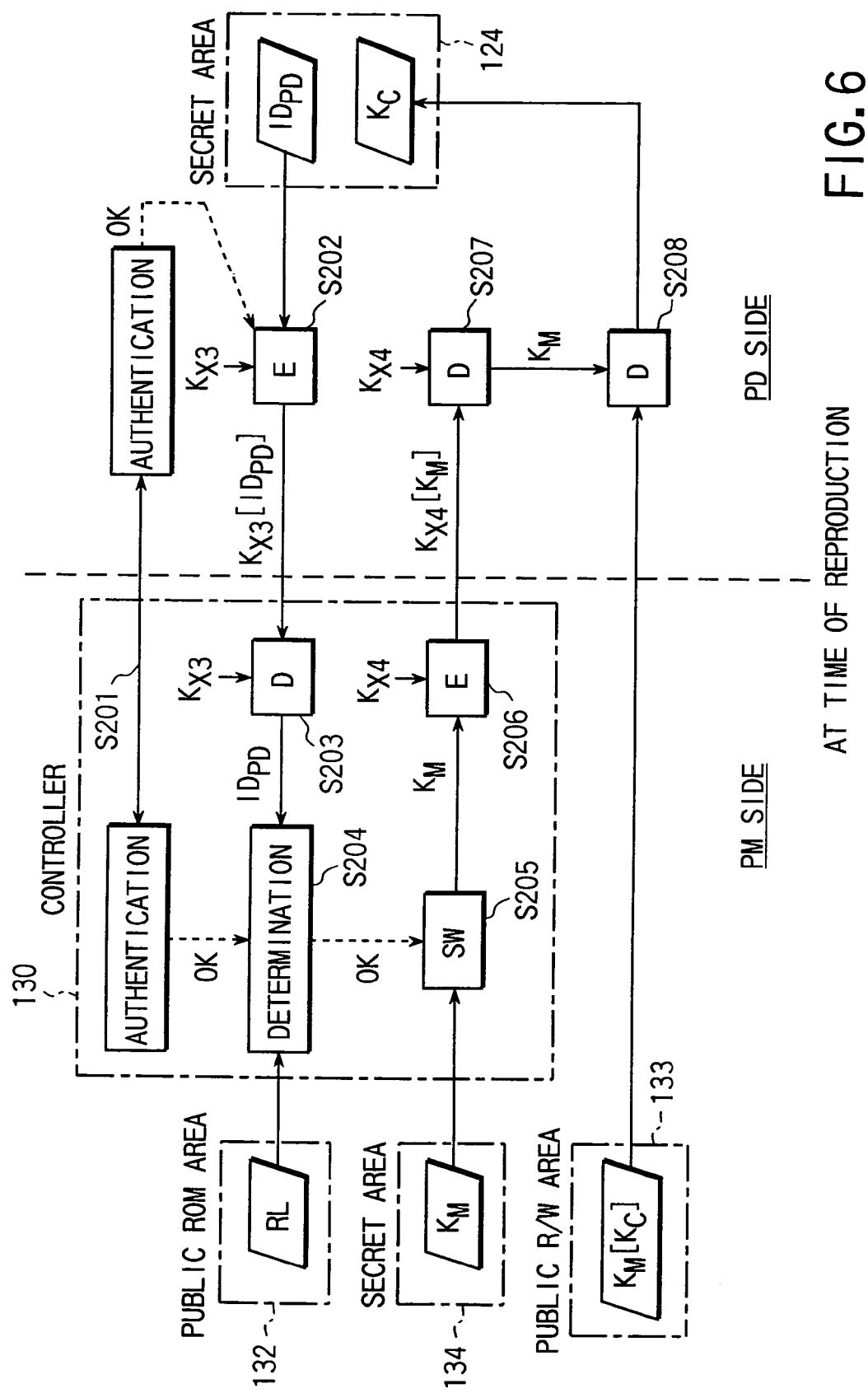
FIG. 6 is a view for explaining operations at a time of decrypting and reproducing encrypted contents, which are stored in the storage medium, on the recording/reproducing device.

Referring now to a flow chart of FIG. 6, a description will be given of an operation in which the encrypted contents stored in the PM 13 are decrypted and reproduced by the recording/reproducing device (PD) 12.

When an instruction for reproduction has been issued to, for example, the PD 12 and the PM 13 has been loaded in the medium I/F 12f of PD 12, mutual authentication is effected (like step S101) between the CPU 12a of PD 12 and the controller 130 of PM 13 (step S201). If it is confirmed that the PD 12 and the PM 13 are mutually proper counterparts by the mutual authentication, key exchange is made between the CPU 12a of PD 12 and the controller 130 of PM 13 and the same authentication key ($K_{X3}$) is shared.

The CPU 12a of PD 12 reads out its own identification information $ID_{PD}$ kept in secrecy on the secret area 124, and encrypts the read-out information $ID_{PD}$ using the authentication key ($K_{X3}$). The encrypted information $ID_{PD}$ (=$K_{X3}[ID_{PD}]$) is sent from the medium I/F 12f to the PM 13 (step S202).

The controller 130 of the PM 13 decrypts the information $K_{X3}[ID_{PD}]$ from the PD 12 with the key ($K_{X3}$) acquired by the previous key exchange, and obtains the information $ID_{PD}$ (step S203).

Then, the controller 130 of the PM 13 refers to the revocation list RL in the public ROM area 132, using the decrypted identification information $ID_{PD}$ of the PD 12, and determines whether identification information corresponding to the $ID_{PD}$ is registered. Thereby, it is determined whether use of the PM 13 by the PD 12 is to be revoked or not (step S204).

If the identification information corresponding to the $ID_{PD}$ is registered on the revocation list RL, the controller 130 determines that the use of the PM 13 by the PD 12 should be revoked, and halts the subsequent process.

On the other hand, if the identification information corresponding to the $ID_{PD}$ is not registered on the revocation list RL, the controller 130 determines that the use of the PM 13 by the PD 12 is permitted and reads out the medium key $K_M$ kept in secrecy on the secret area 134 (step S205). Then, the controller 130 performs key exchange with the CPU 12a of PD 12 (via the medium I/F 12f of PD 12) and shares the same authentication key ($K_{X4}$). In addition, the controller 130 encrypts the read-out medium key $K_M$ using the authentication key ($K_{X4}$) and sends the encrypted $K_M$ (=$K_{X4}[K_M]$) to the PD 12 (step S206).

The CPU 12a of PD 12 decrypts the $K_{X4}[K_M]$ from the PM 13, using the authentication key ($K_{X4}$) acquired by the previous key exchange, and obtains the medium key $K_M$ (step S207).

The CPU 12a of PD 12 reads out the encrypted contents key $K_C$ (=$K_M[K_C]$) stored on the public R/W area 133 of PM 13 and decrypts it using the medium key $K_M$ obtained in step S207. The decrypted contents key $K_C$ is written on the secret area 124 and kept in secrecy (step S208). Accordingly, using the decrypted contents key $K_C$ (and, if necessary, the previously decrypted medium key $K_M$), the PD 12 can decipher and reproduce the encrypted contents stored on the public R/W area 133 of PM 13.

As has been described above, according to the present embodiment, the PD 12 receives from the PM 13 the (encrypted) medium key $K_M$, which would not be delivered from the PM 13 to the PD 12 if the use of the PM 13 is revoked in accordance with the revocation list RL. Using the medium key $K_M$, the PD 12 decrypts the encrypted contents key ($K_M[K_C]$) kept in secrecy on the secret area 134 of PM 13. The encrypted key is written on the secret area 124 of the PD 12. Accordingly, compared to the method in which the authentication key is exchanged between the PD 12 and PM 13 and the encrypted contents key is decrypted using the authentication key, the use of the PM 13 by the PD, which is an object of revocation designated in the revocation list, can be surely revoked (excluded).

In the above-described embodiment, when information kept in secrecy on the secret area, or information which is to be kept in secrecy on the secret area, is transmitted/received between the LCM 1 and PM 13, or between the PD 12 and PM 13, the information is encrypted using the authentication key $K_{Xi}$ (i=1 to 4). In this case, the encrypting with use of the authentication key is not always necessary. However, in order to ensure the protection of contents, the encrypting using the authentication key is preferable.

In the above embodiment, the revocation list RL is registered on the public ROM area 132. However, it may be registered anywhere if falsification of the list RL is prevented. For example, the revocation list RL may be registered on the secret area 134 which can be accessed only by a secret specific procedure.

As has been described above in detail, according to the present invention, it is possible to revoke use of the storage medium by an improper electronic device, thereby preventing unlawful use of contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory card comprising:
    a storage portion including a secret area which is capable of being accessed only by a specific secret procedure and a public area which is capable of being accessed by an ordinary procedure, the public area including a rewritable public area and a read-only public area on which revocation information is registered, the revocation information being used to determine whether or not use of the memory card by an electronic device is to be revoked; and
    a controller which determines whether or not use of the memory card by an electronic device which attempts to access the memory card is to be revoked, based on the revocation information registered on the read-only public area of the memory card and information sent from the electronic device, wherein the controller sends a key needed for a content exchange to the electronic device when the controller does not determine that use of the memory card by the electronic device is to be revoked, and wherein a content which is encrypted using the key is written on the rewritable public area of the memory card by the electronic device.

2. The memory card according to claim 1, wherein when the controller determines that use of the memory card by the electronic device should be revoked, a subsequent process is halted.

3. The memory card according to claim 1, wherein the read-only public area is a storage area provided on a read-only non-volatile memory.

4. A memory card comprising:
    a storage portion including a secret area which is capable of being accessed only by a specific secret procedure and a public area which is capable of being accessed by an ordinary procedure, the public area including a rewritable public area and a read-only public area on which revocation information is registered, the revocation information being used to determine whether or not use of the memory card by an electronic device is to be revoked; and
    a controller which determines whether or not use of the memory card by an electronic device which attempts to access the memory card is to be revoked, based on the revocation information registered on the read-only public area of the memory card and information sent from the electronic device, wherein the controller sends a key needed for a content exchange to the electronic device when the controller does not determine that use of the memory card by the electronic device is to be revoked, and wherein a content which is encrypted using the key is read out from the rewritable public area of the memory card by the electronic device.

5. The memory card according to claim 4, wherein when the controller determines that use of the memory card by the electronic device should be revoked, a subsequent process is halted.

6. The memory card according to claim 4, wherein the read-only public area is a storage area provided on a read-only non-volatile memory.

7. A contents protection method applied to a memory card having a storage portion including a secret area which is capable of being accessed only by a specific secret procedure and a public area which is capable of being accessed by an ordinary procedure, the method comprising the steps of:
    registering revocation information on a read-only public area in the public area of the memory card, the revocation information being used to determine whether or not use of the storage medium memory card by an electronic device is to be revoked;
    determining, by a controller provided in the memory card, whether or not use of the memory card by an electronic device which attempts to access the memory card is to be revoked, based on the revocation information registered on the read-only public area and information sent from the electronic device;
    sending a key needed for a content exchange from the controller provided in the memory card to the electronic device when it is not determined that use of the memory card by the electronic device is to be revoked; and
    writing a content which is encrypted using the key on a rewritable public area in the public area of the memory card by the electronic device.

8. The method according to claim 7, wherein when it is determined in the determining step that use of the memory card by the electronic device should be revoked, a subsequent process is halted.

9. The method according to claim 7, wherein the read-only public area is a storage area provided on a read-only non-volatile memory.

10. A contents protection method applied to a memory card having a storage portion including a secret area which is capable of being accessed only by a specific secret procedure and a public area which is capable of being accessed by an ordinary procedure, the method comprising the steps of:

registering revocation information on a read-only public area in the public area of the memory card, the revocation information being used to determine whether or not use of the memory card by an electronic device is to be revoked;

determining, by a controller provided in the memory card, whether or not use of the memory card by an electronic device which attempts to access the memory card is to be revoked, based on the revocation information registered on the read-only public area and information sent from the electronic device;

sending a key needed for a content exchange from the controller provided in the memory card to the electronic device when it is not determined that use of the memory card by the electronic device is to be revoked; and reading out a content which is encrypted using the key from a rewritable public area in the public area of the memory card by the electronic device.

11. The method according to claim 10, wherein when it is determined in the determining step that use of the memory card by the electronic device should be revoked, a subsequent process is halted.

12. The method according to claim 10, wherein the read-only public area is a storage area provided on a read-only non-volatile memory.

* * * * *

UNITED STATES PATENT AND TRADEMARK OFFICE
CERTIFICATE OF CORRECTION

| | | |
|---|---|---|
| PATENT NO. | : 7,137,012 B1 | Page 1 of 1 |
| APPLICATION NO. | : 09/594011 | |
| DATED | : November 14, 2006 | |
| INVENTOR(S) | : Kamibayashi et al. | |

It is certified that error appears in the above-identified patent and that said Letters Patent is hereby corrected as shown below:

Column 10, line 48, change "the storage medium memory card" to --the memory card--.

Signed and Sealed this

Twentieth Day of March, 2007

JON W. DUDAS
*Director of the United States Patent and Trademark Office*